Patented Sept. 26, 1922.

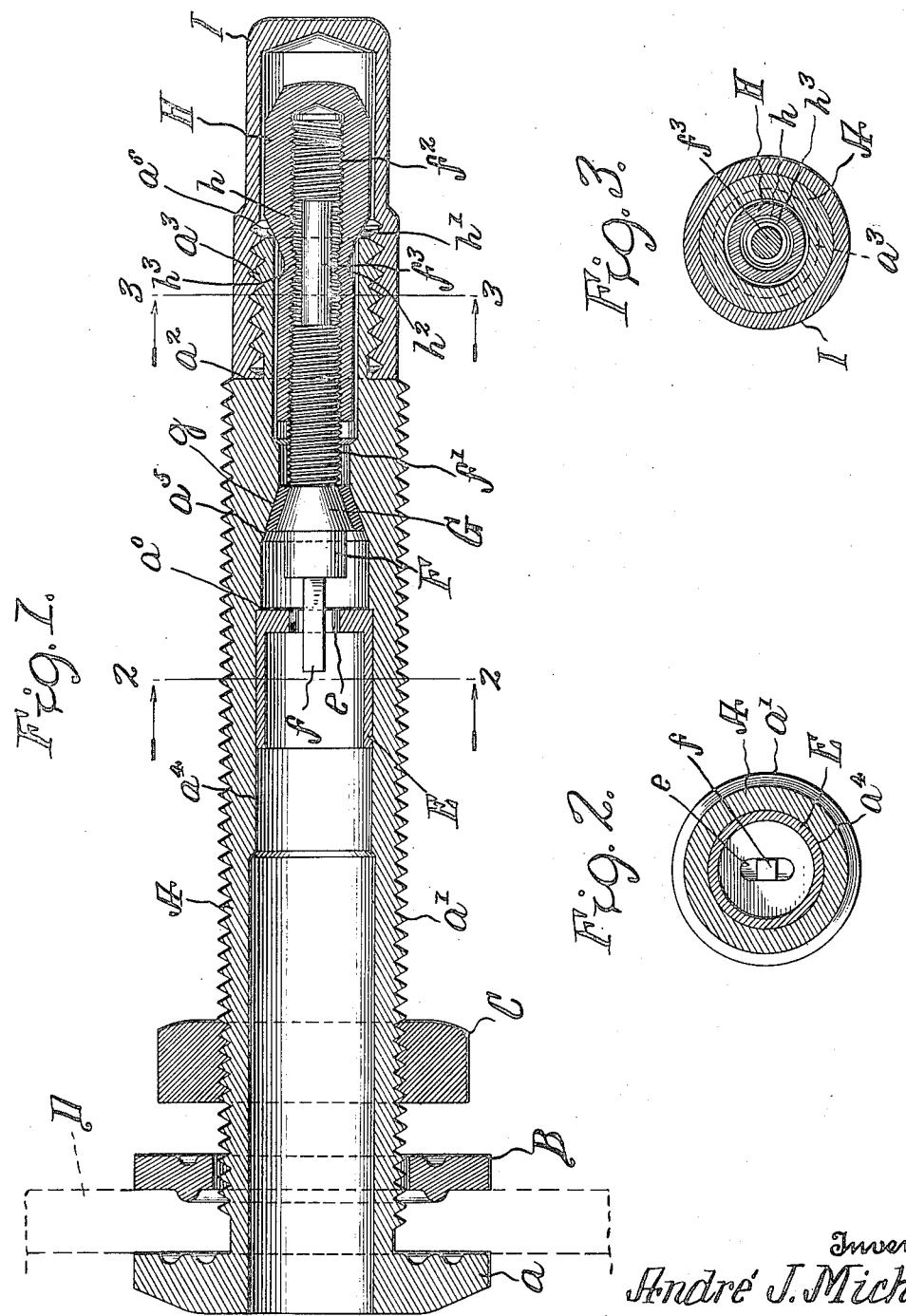

1,430,461

UNITED STATES PATENT OFFICE.

ANDRÉ JULES MICHELIN, OF CLERMONT-FERRAND, FRANCE.

VALVE ATTACHMENT FOR PNEUMATIC TIRES.

Application filed August 17, 1921. Serial No. 493,077.

*To all whom it may concern:*

Be it known that I, ANDRÉ JULES MICHELIN, a citizen of the French Republic, residing at Clermont-Ferrand, France, have invented certain new and useful Improvements in Valve Attachments for Pneumatic Tires; and I do hereby declare the following to be a full, clear, and exact description of the invention, such as will enable others skilled in the art to which it appertains to make and use the same.

My present invention relates to improvements in the construction of valve attachments for pneumatic tires.

The present practice in using such valves is to provide a plastic joint between the valve and its seat, for instance an annular plug of rubber or other yielding material is used, which engages with the coned valve seat and forms a yielding joint which is likely to wear out, or deteriorate, or leak.

According to my present invention I combine with such a joint a second all metal joint which may be used indefinitely without materially wearing or depreciating, or becoming injured in any way.

My invention will be more fully understood after reference to the accompanying drawings, in which like parts are indicated by similar reference symbols throughout the several views, and in which:—

Figure 1 is a central longitudinal section through the valve casing and parts carried thereby, the valve stem and plastic valve being shown in elevation.

Figure 2 shows a section along the line 2—2 of Figure 1, and looking in the direction of the arrows; and Figure 3 shows a section along the line 3—3 of Figure 1, and looking in the direction of the arrows.

A represents a valve casing which is in the form of a hollow cylinder provided with the usual flanged end $a$, and with the usual screw threads $a'$ to receive the washer B, and the nut C, which nut forces the washer B into the position for making a tight joint with the inner tube D, shown in dotted lines in Figure 1.

The valve casing A is shouldered, near its outer end, as at $a^2$, and is provided with a screw-threaded reduced portion $a^3$. The interior of the casing is reduced, as at $a^4$, and provided with a shoulder $a^5$ to engage the cup E which is forced into place and held by frictional engagement against turning in the casing. This cup is provided with an elongated slot $e$ in its bottom, through which passes the squared end $f$ of the valve stem F, and thus the part $f$ of the valve stem is free to slide through said slot but cannot turn therein.

The valve stem F carries the cone valve G which rests on the coned seat $a^5$, and the said valve may be covered with rubber or similar yielding material $g$ so as to form a plastic joint with its seat.

The valve stem F, beyond the valve G, is provided with two sets of screw threads $f'$ and $f^2$ connected by the reduced portion $f^3$ of the valve stem. These screw threads are both in the same direction and engage the internal screw threads $h$ of the metal valve H which is coned as at $h'$ and makes a tight joint when set up with the inner edge $a^6$ of the outer end of the valve casing. It will be seen that screwing up on this valve H will make a tight all metal joint at the point $a^6$ and at the same time will draw the plastic valve G firmly on its seat. Thus when we set up on the valve H, we at the same time tighten the valve G, and when we ease up on the valve H, it is possible to push the valve stem inward and loosen the valve G from its seat.

The squared end $f$ of the valve stem F will prevent the said valve stem from turning as the valve H is set up, and the turning of this valve H in the setting up operation will tend to keep the metal joint at $a^6$ ground and hence tight. In order to prevent the valve H from being accidentally turned so far as to fall from the stem F, and possibly be lost, I dent in the wall of said valve as at $h^2$ where it registers with the reduced portion $f^3$ of the valve stem F. The consequence is that the valve H may be screwed backwards or forwards through the limited distance required, but when the distorted teeth $h^3$ engage either the threaded segments $f'$ or $f^2$ of the valve stem F, the turning movement of the valve H is arrested, and it is thus permanently locked on the valve stem F after the parts are properly assembled.

As a final protection to the projecting end of the apparatus, a hollow screw cap I is provided to screw over the reduced end $a^3$ of the valve casing A. Thus it will be seen that I provide a valve arrangement in which there is a double seal to prevent the escape of air from the inner tube of the tire; this double seal consisting first of the plastic valve G on its seat, and second of an all metal valve H engaging on a metallic seat, the two valves being oppositely disposed, and the setting up of the outer valve tending to draw the inner valve more firmly on its seat, and the releasing of the outer valve permitting the longitudinal movement of the valve stem, as is required when refilling the tube with compressed air.

In order to assemble the parts of the valve attachment for use with the inner tube, the washer B is slipped over the outside of the casing, and the nut C screwed nearly home. The valve stem carrying the valve H is inserted in the larger end of the casing, and the cup E is forced down to the position shown in Figure 1. The valve H is then screwed down until the part $h^2$ clears the screw threads $f^2$ of the valve stem, and then the shell of the part H is dented inwards causing the teeth $h^3$ to project into the annular recess between the teeth $f'$ and $f^2$, locking the valve H against being removed from the valve stem F, although allowing the requisite longitudinal play of the valve H.

Finally the cap I is screwed on and the parts are in the position shown in Fig. 1, except that they are not connected with the inner tube D shown in dotted lines in said figure. The valve stem is secured to the inner tube in the usual way, as is well known in the art.

It will be obvious that various modifications might be made in the herein described apparatus, and in the construction, combination and arrangement of parts which could be used without departing from the spirit of my invention; and I do not mean to limit the invention to such details except as particularly pointed out in the claim.

I claim:

In a valve for pneumatic tires, the combination with a hollow valve casing provided with a tapered valve seat therein, and a second valve seat at the outer end thereof, of a valve stem provided with a yielding conical valve adapted to fit on said valve seat, said valve stem being provided with an outwardly projecting end having screw threads thereon separated by an annular groove, and a metal valve provided with a thin tubular shank having internal screw threads and adapted to screw over said screw threads on the valve stem and to seat against the outer face of said casing, said shank being dented inwards into said annular groove, whereby said shank and said metal valve are prevented from accidental removal from said valve stem, but are permitted limited longitudinal and rotary movement thereon, with means for holding said valve stem against turning in said valve casing as said metal valve is screwed into engagement.

ANDRÉ JULES MICHELIN.